(12) United States Patent  (10) Patent No.: US 7,540,883 B2
Lai et al.  (45) Date of Patent: Jun. 2, 2009

(54) REACTIVE YELLOW DYE COMPOSITION

(75) Inventors: Bao-Kun Lai, Taoyuan Hsien (TW);
Cheng-Hsiang Hsu, Taoyuan Hsien (TW); Ya-Chi Tseng, Taoyuan Hsien (TW); Huei-Chin Huang, Taoyuan Hsien (TW)

(73) Assignee: Everlight USA, Inc., Pineville, NC (US)

( * ) Notice: Subject to any disclaimer, the term of this patent is extended or adjusted under 35 U.S.C. 154(b) by 132 days.

(21) Appl. No.: 11/882,477

(22) Filed: Aug. 2, 2007

(65) Prior Publication Data

US 2008/0282484 A1  Nov. 20, 2008

(30) Foreign Application Priority Data

May 18, 2007 (CN) .......................... 2007 1 0107055

(51) Int. Cl.
C09B 67/22 (2006.01)
C07C 245/08 (2006.01)
(52) U.S. Cl. ........................ 8/641; 8/669; 8/673; 8/681; 8/687; 8/688; 534/557
(58) Field of Classification Search ............... 8/641, 8/669, 673, 681, 687, 688; 534/557
See application file for complete search history.

(56) References Cited

U.S. PATENT DOCUMENTS 6,203,581 B1  3/2001  Lai et al. ..................... 8/549

FOREIGN PATENT DOCUMENTS

WO  WO 2007/039573 A2 * 4/2007

OTHER PUBLICATIONS

STIC Search Report dated Feb. 5, 2009.*

* cited by examiner

*Primary Examiner*—Eisa B Elhilo
(74) *Attorney, Agent, or Firm*—Bacon & Thomas, PLLC

(57) ABSTRACT

The present invention discloses a reactive yellow dye composition comprising component (A) and component (B). The component (A) is a reactive azo dye represented by the following formula (I) or formula (II),

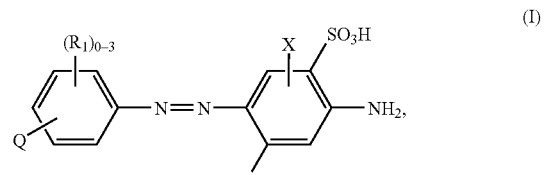

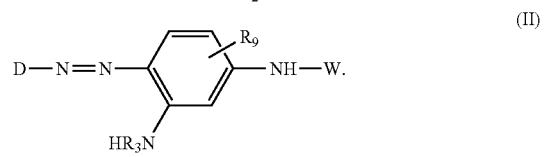

The component (B) is a reactive azo dye represented by the following formula (III),

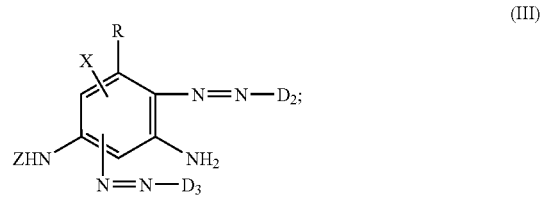

wherein the substituents of the formulas (I), (II) and (III) are defined the same as in the specification. Moreover, the reactive yellow dye composition of the present invention has excellent build-up, wash-off and light fastness and can be applied with dyestuffs in other colors.

21 Claims, No Drawings

REACTIVE YELLOW DYE COMPOSITION

BACKGROUND OF THE INVENTION

1. Field of the Invention

The present invention relates to a reactive yellow dye composition, which improves the properties, such as build-up, wash-off and wash fastness, of the current reactive yellow dye compositions.

2. Description of the Related Art

The conventional yellow dye, such as C.I. Reactive Yellow 107, C.I. Reactive Yellow 145 or C.I. Reactive Yellow 176, is a single reactive yellow dye.

SUMMARY OF THE INVENTION

The present invention provides a reactive yellow dye composition suitable for dyeing leather, wool, silk, nylon, cellulose fibers and cellulose fiber blends or interwoven fabrics.

The reactive yellow dye composition of the present invention comprises the following component (A) and component (B).

The component (A) is 98% to 50% by weight of at least one reactive azo dye represented by the following formula (I) or formula (II),

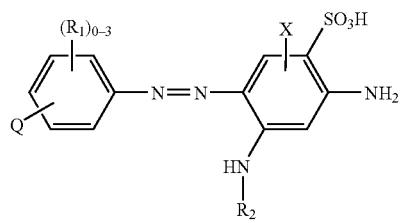

wherein $(R_1)_{0-3}$ represents 0, 1, 2, or 3 $R_1$ substituents, which can be the same or different, selected from the group consisting of: halogen, carboxyl, sulfo, $C_{1-4}$ alkyl and $C_{1-4}$ alkoxyl;
$R_2$ is H, $COCH_3$ or $CONH_2$;
Q is —NH—CO—CH(Hal)-$CH_2$(Hal), —NH—CO—C(Hal)=$CH_2$ or —$SO_2$—Y, wherein Y is —$CH_2CH_2OSO_3H$, —CH=$CH_2$ or —$CH_2CH_2U$, U is a leaving group which is eliminable by a base; Hal is halogen; X is H or

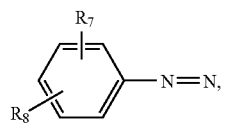

wherein $R_7$ and $R_8$ each independently is selected from the group consisting of: H, methyl, —COOH, —$OCH_3$, —$OC_2H_5$, —$SO_3H$, —Cl and —$SO_2Y$, wherein Y is defined the same as above.

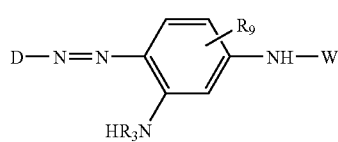

wherein, $R_3$ is H, $COCH_3$ or $CONH_2$;
$R_9$ is H, methyl, —$OCH_3$, —$OC_2H_5$, —$SO_3H$ or —Cl;
D is the following (D-a) group,

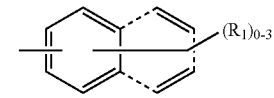

wherein $(R_1)_{0-3}$ are defined the same as the $(R_1)_{0-3}$ of the reactive azo dye represented by formula (I);
W is

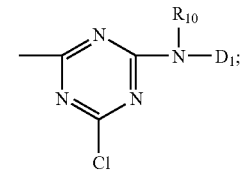

wherein $R_{10}$ is H, methyl or ethyl;
$D_1$ is the following (D-b) group,

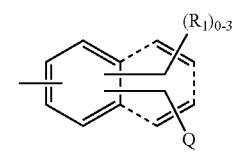

wherein $(R_1)_{0-3}$ and Q are defined the same as that of the reactive azo dye represented by formula (I).

The component (B) is 2% to 50% by weight of at least one reactive azo dye represented by the following formula (III),

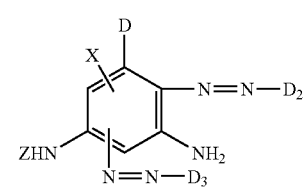

wherein R is H or COOH;
X is defined the same as the X of the reactive azo dye represented by formula (I) and, preferably, X is H;
Z is H, —$CH_2SO_3H$, —$CH_2CH_2SO_3H$, —$CH_2COOH$ or —$CH_2CH_2COOH$;
$D_2$ and $D_3$ each independently is selected from the group consisting of the following (D-a) and (D-b) groups,

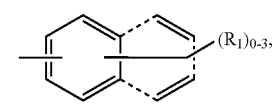

-continued

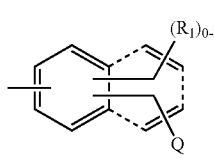
(D-b)

wherein $(R_1)_{0-3}$ and Q are defined the same as that of the reactive azo dye represented by formula (I).

In the dye composition of the present invention, the $(R_1)_{0-3}$ of the reactive azo dye represented by formula (I) are preferable 0, 1, 2, or 3 $R_1$ substituents, which can be the same or different, selected from the group consisting of: sulfo, methyl and methoxyl. The Q of the reactive azo dye represented by formula (I) is preferable —$SO_2$—Y, wherein Y is —$CH_2CH_2OSO_3H$, —$CH$=$CH_2$ or —$CH_2CH_2U$, U is a leaving group which is eliminable by a base. The substituent U is preferably selected from the group consisting of:

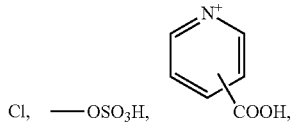

and quaternary ammonium salt

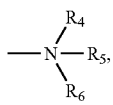

wherein $R_4$, $R_5$ and $R_6$ each independently is $C_{1-4}$ alkyl.

In the dye composition of the present invention, preferably, the $D_2$ and $D_3$ of the reactive azo dye represented by formula (III) each independently is the following (D-b) group,

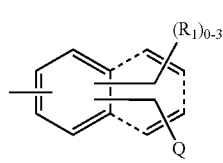
(D-b)

wherein $(R_1)_{0-3}$ represents 0, 1, 2, or 3 $R_1$ substituents, which can be the same or different, selected from the group consisting of: sulfo, methyl and methoxyl; Q is —NH—CO—CH(Hal)-$CH_2$(Hal), —NH—CO—C(Hal)=$CH_2$ or —$SO_2$—Y, wherein Y is —$CH_2CH_2OSO_3H$, —$CH$=$CH_2$ or —$CH_2CH_2U$, U is a leaving group which is eliminable by a base; Hal is halogen. Preferably, Q is —$SO_2$—Y, wherein Y is —$CH_2CH_2OSO_3H$, —$CH$=$CH_2$ or —$CH_2CH_2U$, U is a leaving group which is eliminable by a base; Hal is halogen. In the reactive azo dye represented by formula (III), the base-eliminable U is preferably selected from the group consisting of:

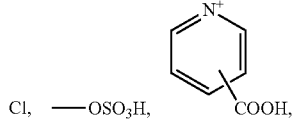

and quaternary ammonium salt

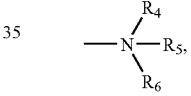

wherein $R_4$, $R_5$ and $R_6$ each independently is $C_{1-4}$ alkyl.

The examples of the reactive azo dye represented by formula (I) of the present invention include the following formulas (1), (2) and (3), but the examples of the compounds are not limited thereto.

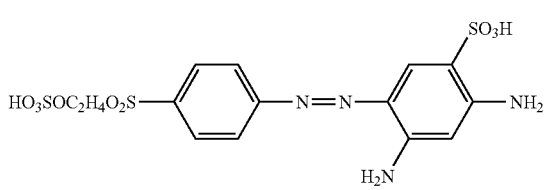
(1)

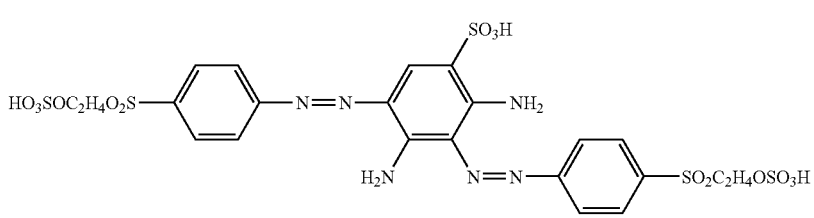
(2)

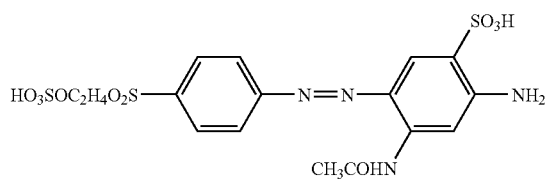
(3)
The examples of the reactive azo dye represented by formula (II) of the present invention include the following formula (4), but the examples of the compounds are not limited thereto.
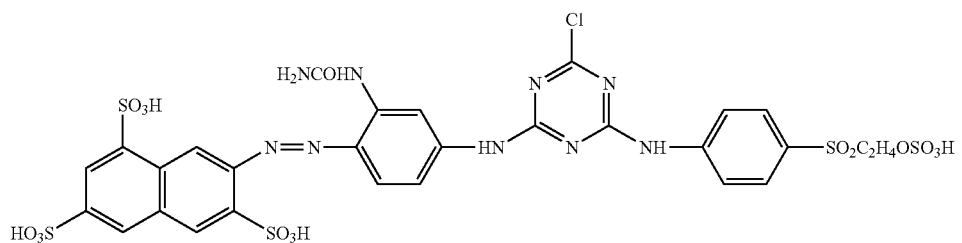
(4)
The examples of the reactive azo dye represented by formula (III) of the present invention include the following formulas (5), (6) and (7), but the examples of the compounds are not limited thereto.
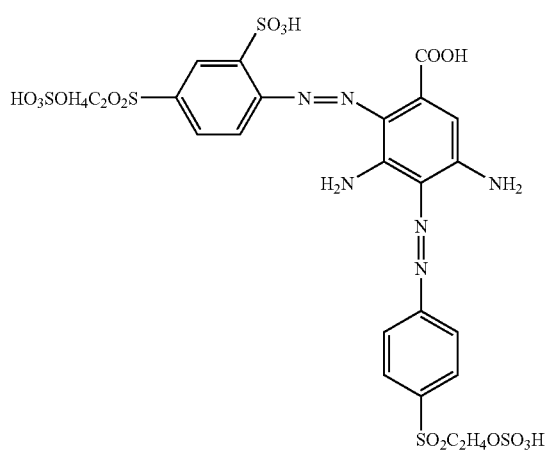
(5)
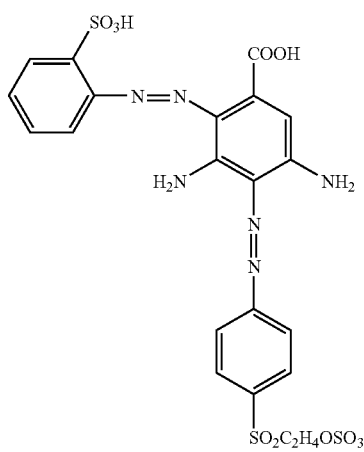
(6)
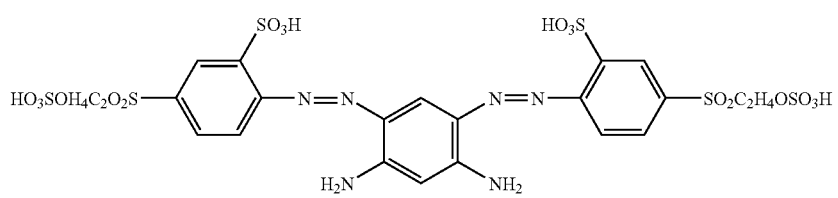
(7)

The ratio of the dye components used in the reactive yellow dye composition of the present invention can be varied without limitation. In general, the minimum of the relative percentage by weight is 2% and the maximum of that is 98%; preferably, the component (A) of the present invention is 70% to 98% by weight and the component (B) is 30% to 2% by weight; more preferably, the component (A) of the present invention is 80% to 95% by weight and the component (B) is 20% to 5% by weight.

The dye molecule of the present invention is presented in the forms of free acid, but it is not limited. While using in the examples, the dye molecule can be presented as a salt, such as alkaline metal salts, alkaline earth metal salts or ammonium salts, and preferably, it is sodium salt, potassium salt, lithium salt or ammonium salt.

The reactive yellow dye composition of the present invention is suitable for dyeing cellulose fibers such as cotton, artificial cotton, linen and artificial linen, polyamine fibers such as wool, silk and nylon, and blends or interwoven fabrics. The utilization of the dye composition of the present invention obtains various dyestuffs with good dyeing properties. For example, the dye composition of the present invention has excellent build-up, wash-off and light fastness and can be applied with dyestuffs in other colors.

DETAILED DESCRIPTION OF THE PREFERRED EMBODIMENT

The formula (I) compound of the present invention can be synthesized by the following method:

Firstly, diazotizing the amine compound of the following formula (a) and proceeding a coupling reaction between the diazotized formula (a) and the amine compound of the following formula (b) under acid pH value of 1-7 and temperature of 0~30° C. to obtain the formula (I) compound of the present invention.

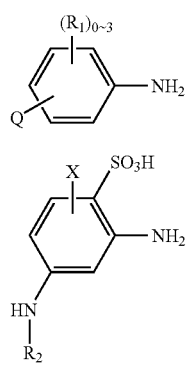

(a)

(b)

wherein $(R_1)_{0-3}$, $R_2$, Q and X are defined the same as above. The preparation method is disclosed in the German Patent Gazette No. DE 1911427 as the preparation method of formula (1) thereof and in the German Patent Gazette No. DE 3134357 as the preparation method of formula (3) thereof.

The formula (II) compound of the present invention can be synthesized by the following method:

Firstly, diazotizing the amine compound of the following formula (c) and proceeding a coupling reaction between the diazotized formula (c) and the amine compound of the following formula (d) under acid pH value of 1-7 and temperature of 0~30° C. to obtain the formula (p) compound of the present invention.

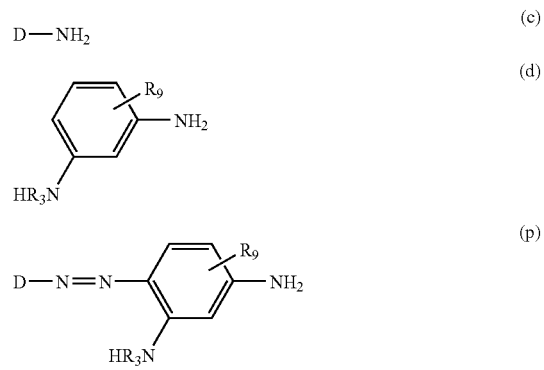

(c)

(d)

(p)

wherein $R_3$, $R_9$ and D are defined the same as above. Then, proceeding condensation reaction with the compound (p) and trichloro-s-triazine under pH value of 1-7 and temperature of 0~25° C. Adding $HNR_{10}D_1$ compound, wherein $R_{10}$ and $D_1$ are defined the same as above, into the compound to further proceed the condensation reaction under pH value of 6-8 and temperature of 25~60° C. to obtain the formula (II) compound of the present invention. The preparation method is disclosed in the Japanese Patent Gazette No. JP 56118974 as the preparation method of formula (4) thereof.

The formula (III) compound of the present invention can be synthesized by the following method:

Firstly, diazotizing the amine compound of the following formula (e) and proceeding a coupling reaction between the diazotized formula (e) and the amine compound of the following formula (f) under acid pH value of 1-3 and temperature of 0~30° C.

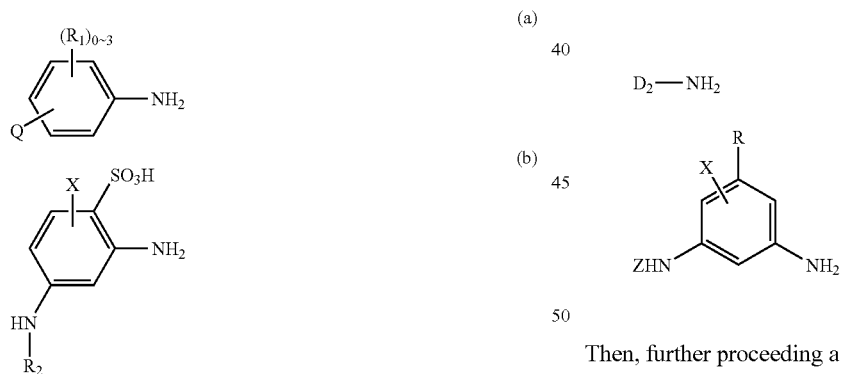

(e)

(f)

Then, further proceeding a coupling reaction with the diazonium salt of the following formula (g) under pH value between acid to neutrality, such as pH value of 3.0~7.0, and temperature of 0~30° C. to obtain the formula (III) compound of the present invention. The binding sites selected by the $D_3$-$NH_2$ will vary according to the difference of the materials and reaction conditions. In which, the R, X, Z, $D_2$ and $D_3$ are defined the same as above.

$D_3$-$NH_2$ (g)

The dye composition of the present invention can be prepared in several ways. For example, the dyes can be prepared separately and then mixed together in a suitable mixer, such as a tumbler, or in a suitable mill, such as a ball mill and a sand mill. The methods described herein are all performing by stirring and mixing individual dyes to form a dye base, or by mixing individual dyes during the process of exhaust dyeing or printing.

The types of the reactive yellow dye composition according to the present invention are not limited, which can be powder, grain or liquid. The reactive yellow dye composition of the present invention can selectively comprise inorganic salts, such as sodium sulfate and sodium chloride; dispersing agents, such as β-naphthalene sulfonic acid-formaldehyde condensates, methylnaphthalene sulfonic acid-formaldehyde condensates and naphthol amine compounds; non-dusting agents, such as Bis(2-ethylhexyl)terephthalate; pH buffering agents, such as sodium acetate and sodium phosphate; water softener, such as polyphosphoester; or conventional auxiliary agents.

The reactive yellow dye composition of the present invention can be applied to dye leather, wool, silk, nylon, cellulose fibers and blends or interwoven fabrics containing cellulose fiber materials, but it is not limited thereto. There are no particular limitations for the cellulose fiber materials that can be used. The cellulose fiber materials may include natural or regenerated cellulose fibers, such as cotton fibers, flax, hemp, ramie or viscose rayon.

The dyeing methods for which the present invention may apply are not limited. The examples of the dyeing methods include exhaust dyeing, continuous dyeing, cold batch-up dyeing method and printing. More preferably, the present invention may apply for discharge printing. Besides, the present invention may be used in the dye composition for digital inkjet printing ink as well.

For dyeing cellulose fibers and blends or interwoven fabrics containing cellulose fiber materials, the reactive yellow dye composition of the present invention has industrial merits. The reactive yellow dye composition has good build up, level dyeing property and dye base stability to obtain dyeing, printing or discharge printing products with high quality.

Hereinafter, the present invention will be further explained. However, it is to be understood that the examples below are only for illustrated, but not to limit the scope of the present invention. In the examples, the compound is represented in the forms of free acid, but it can be metal salts and alkaline metal salts, especially sodium salts, in the practical use. Without specific explanations, the unit of the parts and percentage used in the examples is calculated by weight and the temperature is represented by centigrade degree (° C.).

PREPARATION EXAMPLE 1

Dissolving 28.1 parts of 1-aminobenzene-4-β-sulfatoethylsulfone in 200 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completed. Then, adding 9.4 parts of 2,4-amino-1-sulfonic benzene into the reaction solution, adjusting the pH value of the reaction solution to 2.5~3.0 with sodium carbonate under the temperature of 0-10° C. After stirring the reaction solution for 3 hours, adjusting the pH value of the reaction solution to 5~6 with sodium carbonate again under the temperature of 10-15° C. and stirring the mixture till the coupling reaction is completed. At last, adding NaCl to salt-out and filtrating the solution to obtain the following formula (2) compound.

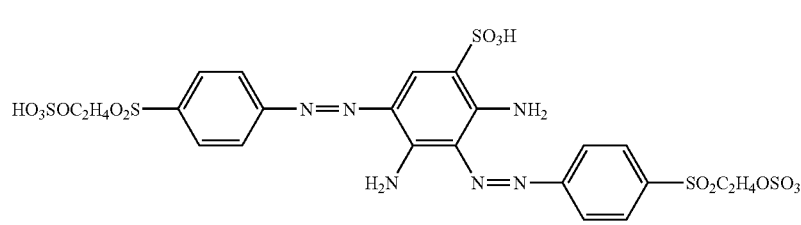

(2)

PREPARATION EXAMPLE 2

Dissolving 36.1 parts of 1-aminobenzene-2-sulfonic acid-4-β-sulfato-ethylsulfone in 200 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completed. After that, adding 15.2 parts of 3,5-diaminobenzoic acid powders into the reaction solution and stirring the reaction mixture till the coupling reaction is completed. At last, adding NaCl to salt-out and filtrating the solution to obtain the following formula (III-1) compound.

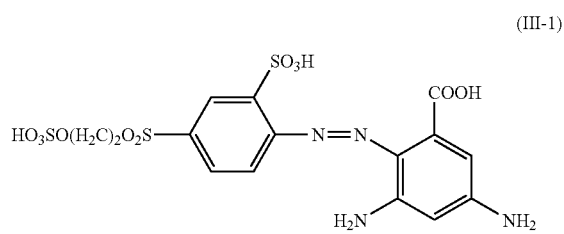

(III-1)

Dissolving 28.1 parts of 1-aminobenzene-4-β-sulfatoethylsulfone in 200 parts of ice water, adding 24 parts of 32% HCl aqueous solution therein and stirring the solution adequately, then adding 7.0 parts of sodium nitrite aqueous solution and stirring the solution continuously under the temperature of 0~5° C. till the diazotization is completed. Then, adding the above formula (III-1) compound into the reaction solution, adjusting the pH value of the reaction solution to 3.5~5.0 with sodium carbonate, and stirring the mixture under the temperature of 5-15° C. till the coupling reaction is completed. Finally, adding NaCl to salt-out and filtrating the solution to obtain an orange dyestuff of formula (5) compound.

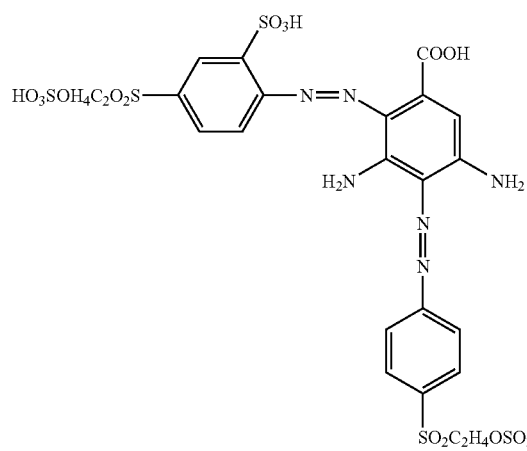

(5)

PREPARATION EXAMPLE 3

Dissolving 17.3 parts of 1-aminobenzene-2-sulfonic acid in 200 parts of ice water, adding 24 parts of 32% HCl aqueous solution therein and stirring the solution adequately, then adding 7 parts of sodium nitrite aqueous solution and stirring the solution continuously under the temperature of 0~5° C. till the diazotization is completed. After that, adding 15.2 parts of 3,5-diaminobenzoic acid powders into the reaction solution and stirring the reaction mixture till the coupling reaction is completed. At last, adding NaCl to salt-out and filtrating the solution to obtain the following formula (III-2) compound.

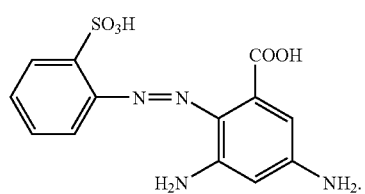

(III-2)

Dissolving 28.1 parts of 1-aminobenzene-4-β-sulfatoethylsulfone in 200 parts of ice water, adding 24 parts of 32% HCl aqueous solution therein and stirring the solution adequately, then adding 7 parts of sodium nitrite aqueous solution and stirring the solution continuously under the temperature of 0~5° C. till the diazotization is completed. Then, adding the above formula (III-2) compound into the reaction solution, adjusting the pH value of the reaction solution to 3.5 with sodium carbonate, and stirring the mixture under the temperature of 10-15° C. till the coupling reaction is completed. Finally, adding NaCl to salt-out and filtrating the solution to obtain an orange dyestuff of formula (6) compound.

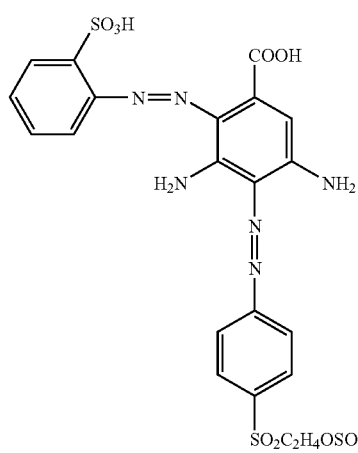

(6)

PREPARATION EXAMPLE 4

Dissolving 72.2 parts of 1-aminobenzene-2-sulfonic acid-4-β-sulfatoethylsulfone in 2000 parts of ice water, adding 48 parts of 32% HCl aqueous solution therein and stirring the solution adequately, then adding 14.0 parts of sodium nitrite aqueous solution and stirring the solution continuously under the temperature of 0~5° C. till the diazotization is completed. After that, adding 10.8 parts of m-phenylenediamine powders into the reaction solution and stirring the reaction mixture for 3 hours, and then adjusting the pH value of the reaction mixture to 3.5~6.0 with sodium carbonate, and stirring the mixture under the temperature of 5-15° C. till the coupling reaction is completed. At last, adding NaCl to salt-out and filtrating the solution to obtain an orange dyestuff of formula (7) compound.

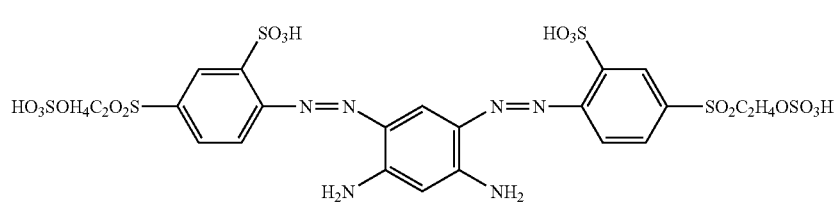

(7)

EXAMPLE 1

Mixing 95% of formula (1) dye compound and 5% of formula (5) dye compound to obtain an evenly mixed dye composition.

EXAMPLE 2 TO EXAMPLE 33

Repeating the steps of Example 1, except that the components and percentage by weight of the reactive dye compounds are substituted according to the following Table 1 in order to obtain evenly mixed dye composition respectively.

TABLE 1

| | Components and Percentage by Weight | |
|---|---|---|
| Examples | Component (A) | Component (B) |
| 1 | 95% of formula (1) | 5% of formula (5) |
| 2 | 90% of formula (1) | 10% of formula (5) |
| 3 | 85% of formula (1) | 15% of formula (5) |
| 4 | 95% of formula (1) | 5% of formula (6) |
| 5 | 90% of formula (1) | 10% of formula (6) |
| 6 | 85% of formula (1) | 15% of formula (6) |
| 7 | 95% of formula (1) | 5% of formula (7) |
| 8 | 90% of formula (1) | 10% of formula (7) |
| 9 | 85% of formula (1) | 15% of formula (7) |
| 10 | 95% of formula (2) | 5% of formula (5) |
| 11 | 90% of formula (2) | 10% of formula (5) |
| 12 | 85% of formula (2) | 15% of formula (5) |
| 13 | 95% of formula (2) | 5% of formula (7) |
| 14 | 90% of formula (2) | 10% of formula (7) |
| 15 | 85% of formula (2) | 15% of formula (7) |
| 16 | 95% of formula (3) | 5% of formula (5) |
| 17 | 90% of formula (3) | 10% of formula (5) |
| 18 | 85% of formula (3) | 15% of formula (5) |
| 19 | 95% of formula (3) | 5% of formula (6) |
| 20 | 90% of formula (3) | 10% of formula (6) |
| 21 | 85% of formula (3) | 15% of formula (6) |
| 22 | 95% of formula (3) | 5% of formula (7) |
| 23 | 90% of formula (3) | 10% of formula (7) |
| 24 | 85% of formula (3) | 15% of formula (7) |
| 25 | 95% of formula (4) | 5% of formula (5) |
| 26 | 90% of formula (4) | 10% of formula (5) |
| 27 | 85% of formula (4) | 15% of formula (5) |
| 28 | 95% of formula (4) | 5% of formula (6) |
| 29 | 90% of formula (4) | 10% of formula (6) |
| 30 | 85% of formula (4) | 15% of formula (6) |
| 31 | 95% of formula (4) | 5% of formula (7) |
| 32 | 90% of formula (4) | 10% of formula (7) |
| 33 | 85% of formula (4) | 15% of formula (7) |

Dyeing Test Example 1

Testing the dye composition of Example 1 with the following dyeing method to obtain a yellow dye product with excellent fastness.

I. Exhaust Dyeing:

Dissolving 1 part of the above well-mixed dye composition in 100 parts of distilled water to obtain a dye base. Pouring respectively 20 parts and 40 parts of the dye base into each of two dyeing cups that are washed and cleaned by distilled water. Adding 4.8 parts of Glauber's Salt to each dyeing cup and then pouring distilled water therein to make the amount of the dyeing solution in each dyeing cup be 75 parts in total. After that, 5 parts of 320 g/l alkali solution are added to each dyeing cup. Putting 4 parts of pre-wet pure cotton plain weave into each dyeing solution, covering and locking the dyeing cups, and shaking the dyeing cups to even the dye. Then, putting the dyeing cups into a thermostatic bath of 62° C. and switching on the rotating knob. Raising the temperature to 60° C. within 5 minutes and then maintaining the temperature of 60° C. for sixty minutes. After 60 minutes, taking out the weaves, washing them with cold water, putting them in a steel basin, and heat washing them with boiling water for 10 minutes. Next, putting the weaves in a steel basin containing 2 g/l of soaping agent and soaping them off with boiling water for 10 minutes. After 10 minutes, taking out the weaves, washing them with cold water, and dehydrating them.

II. Printing:

Mixing 100 parts of urea, 10 parts of sodium m-nitrobenzenesulfonate, 20 parts of sodium bicarbonate, 55 parts of sodium alginate and 815 parts of lukewarm water in a vessel and stirring the mixture evenly to form a completely homogeneous printing paste. 46 parts of the printing paste are mixed with 4 parts of dyestuffs to obtain a homogeneous colored paste. Then, a 100-mesh printing screen is covered on an adequate sized piece of cotton fabric and applied with the colored paste. Scraping the applied printing screen with a rubber scraper from up to down to spread the colored paste evenly thereon. Placing the colored fabric in an oven at 65° C. to dry for 5 minutes. Taking the dried fabric out, putting it into a steam oven and steaming it with saturated steam of 102° C.-105° C. for 10 minutes. At last, washing it sequentially with cold water, boiling water and soaping agent, and dehydrating it as the steps in the above exhaust dyeing.

III. Continuous Dyeing:

Mixing 3 parts of dyestuffs, 0.4 parts of sodium alginate and 46.6 parts of distilled water evenly to obtain padding liquor. The padding liquor is put on the padding machine to pad as soon as it is prepared. The temperature of the padding liquor has to be lower than 30° C. The colored fabric padded with pick-up of 70% is dried in an oven of 65° C. for 5 minutes. And then another alkali bath padding with 70% pick-up too, then immediately following by a saturate steaming of 102° C.-105° C. for 40 seconds. At last, washing it sequentially with cold water, boiling water and soaping agent, and dehydrating it as the steps in the above exhaust dyeing.

Dyeing Test Examples 2-33

Repeating the steps of Example 1 and substituting the reactive dye components with those of the Example 2 to Example 33 as shown in Table 1. Repeating the dyeing test of Dyeing Test Example 1 to obtain various yellow dye products with excellent fastness.

Solubility Test Examples 1-33

The 33 dye compositions according to Example 1 to Example 33 of the present invention are subjected to the following solubility test in 150 g/l.

Adding 7.5 parts of dyes and 50 parts of distilled water in 250 ml beaker and stirring the solution with glass stick till it is evenly mixed. Heating the solution to 50±2° C., maintaining the temperature, and stirring the solution for 5 minutes. Pre-wetting TOYO No. 1 filter paper and magnet funnel, extracting the air out and filtering and drying the filter paper and magnet funnel. Pouring the tested dye solution to the filter paper and funnel rapidly and filtering and drying them. Taking out the filter paper and dry it naturally. The result of the solubility test is determined based on the dye remained and attached on the filter paper. If there is no any dye remained and attached on the filter paper, the dye passes the solubility test. The results show that all of the 33 dye compositions according to Example 1 to Example 33 of the present invention pass the solubility test; that is, all of them have good solubility.

COMPARATIVE TEST EXAMPLES 1-4

Repeating the dyeing test of Dyeing Test Example 1 with the single yellow dye of formulas (1), (2), (3) and (4) to obtain various yellow dye products.

Comparison of the Dyeing Test Results:

Appearance Strength:

The appearance strength in the conventional dyeing technology is defined basically based on the absorption and reflection values, i.e., reflection rate and K/S value, of the color sample measured by the spectrophotometer within visible light of 300-700 nm. The strength as conventional known includes color strength and appearance strength. The color strength is the specific value of K/S value of the maximum absorbing wavelength within the visible light of 300-700 nm. The appearance strength is the overall value of the K/S value within the visible light of 300-700 nm. The results of the dyeing test are shown in the following Tables 2-5.

TABLE 2

| Dye Test No. | The Dye Used in the Test | Appearance Strength |
| --- | --- | --- |
| Comparative Dye Test Example 1 | Formula (1) | 100% |
| Dye Test Example 1 | Example 1 | 113.111% |
| Dye Test Example 2 | Example 2 | 115.694% |
| Dye Test Example 3 | Example 3 | 124.464% |
| Dye Test Example 7 | Example 7 | 110.621% |
| Dye Test Example 8 | Example 8 | 124.529% |
| Dye Test Example 9 | Example 9 | 134.867% |

TABLE 3

| Dye Test No. | The Dye Used in the Test | Appearance Strength |
| --- | --- | --- |
| Comparative Dye Test Example 2 | Formula (2) | 100% |
| Dye Test Example 10 | Example 10 | 121.11% |
| Dye Test Example 11 | Example 11 | 142.49% |
| Dye Test Example 12 | Example 12 | 157.18% |
| Dye Test Example 13 | Example 13 | 135.41% |
| Dye Test Example 14 | Example 14 | 150.52% |
| Dye Test Example 15 | Example 15 | 173.07% |

TABLE 4

| Dye Test No. | The Dye Used in the Test | Appearance Strength |
| --- | --- | --- |
| Comparative Dye Test Example 3 | Formula (3) | 100% |
| Dye Test Example 16 | Example 16 | 114.317% |
| Dye Test Example 17 | Example 17 | 125.720% |
| Dye Test Example 18 | Example 18 | 135.676% |
| Dye Test Example 22 | Example 22 | 117.283% |
| Dye Test Example 23 | Example 23 | 137.375% |
| Dye Test Example 24 | Example 24 | 143.860% |

TABLE 5

| Dye Test No. | The Dye Used in the Test | Appearance Strength |
| --- | --- | --- |
| Comparative Dye Test Example 4 | Formula (4) | 100% |
| Dye Test Example 25 | Example 25 | 102.171% |
| Dye Test Example 26 | Example 26 | 114.223% |
| Dye Test Example 27 | Example 27 | 119.023% |
| Dye Test Example 31 | Example 31 | 119.023% |
| Dye Test Example 32 | Example 32 | 125.738% |
| Dye Test Example 33 | Example 33 | 135.584% |

To improve the build-up property of the conventional yellow dye, the present invention takes a reactive yellow dye as a base and mixes it with reactive dyes in orange or other colors, thereby obtaining a yellow dye composition with good build-up.

Although the present invention has been explained in relation to its preferred examples, it is to be understood that many other possible modifications and variations can be made without departing from the scope of the invention as hereinafter claimed.

What is claimed is:

1. A reactive yellow dye composition, comprising:
   (A) 98% to 50% by weight of at least one reactive azo dye represented by the following formula (I) or formula (II),

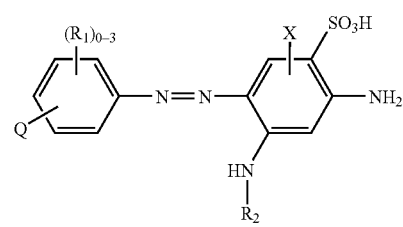

wherein $(R_1)_{0-3}$ represents 0, 1, 2, or 3 $R_1$ substituents, which can be the same or different, selected from the group consisting of: halogen, carboxyl, sulfo, $C_{1-4}$ alkyl and $C_{1-4}$ alkoxyl;

$R_2$ is H, $COCH_3$ or $CONH_2$;

Q is $-NH-CO-CH(Hal)-CH_2(Hal)$, $-NH-CO-C(Hal)=CH_2$ or $-SO_2-Y$, wherein Y is $-CH_2CH_2OSO_3H$, $-CH=CH_2$ or $-CH_2CH_2U$, U is a leaving group which is eliminable by a base; Hal is halogen; X is H or

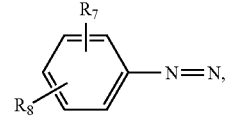

wherein $R_7$ and $R_8$ each independently is selected from the group consisting of: H, methyl, $-COOH$, $-OCH_3$, $-OC_2H_5$, $-SO_3H$, $-Cl$ and $-SO_2Y$, wherein Y is defined the same as above;

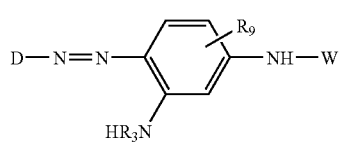
(II)

wherein $R_3$ is H, $COCH_3$ or $CONH_2$;
$R_9$ is H, methyl, —$OCH_3$, —$OC_2H_5$, —$SO_3H$ or —Cl;
D is the following (D-a) group,

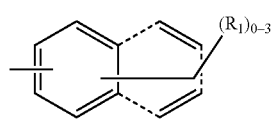
(D-a)

wherein $(R_1)_{0-3}$ are defined the same as the $(R_1)_{0-3}$ of the reactive azo dye represented by formula (I);
W is

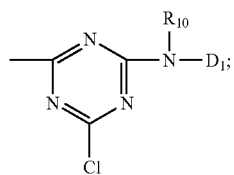

wherein $R_{10}$ is H, methyl or ethyl;
$D_1$ is the following (D-b) group,

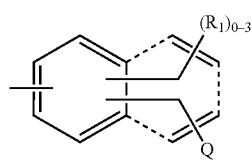
(D-b)

wherein $(R_1)_{0-3}$ and Q are defined the same as that of the reactive azo dye represented by formula (I); and
(B) 2% to 50% by weight of at least one reactive azo dye represented by the following formula (III),

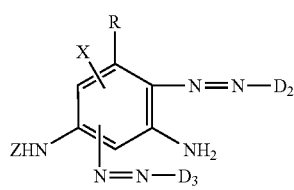
(III)

wherein R is H or carboxyl;
X is defined the same as the X of the reactive azo dye represented by formula (I);
Z is H, —$CH_2SO_3H$, —$CH_2CH_2SO_3H$, —$CH_2COOH$ or —$CH_2CH_2COOH$;
$D_2$ and $D_3$ each independently is selected from the group consisting of the following (D-a) and (D-b) groups,

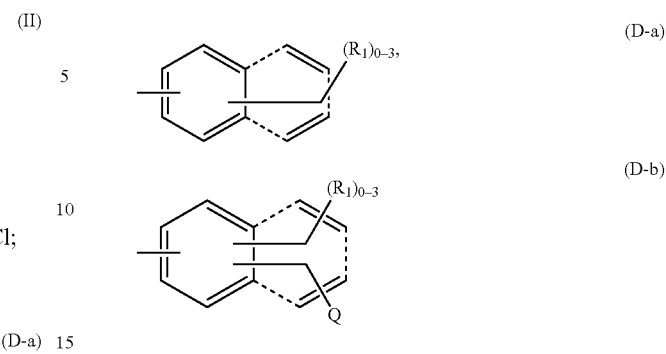
(D-a)

(D-b)

wherein $(R_1)_{0-3}$ and Q are defined the same as that of the reactive azo dye represented by formula (I).

2. The reactive yellow dye composition as claimed in claim 1, wherein the $(R_1)_{0-3}$ of the formula (I) reactive azo dye represents 0, 1, 2, or 3 $R_1$ substituents, which can be the same or different, selected from the group consisting of: sulfo, methyl and methoxyl.

3. The reactive yellow dye composition as claimed in claim 1, wherein the Q of the formula (I) reactive azo dye is —$SO_2Y$, wherein Y is —$CH_2CH_2OSO_3H$, —$CH=CH_2$ or —$CH_2CH_2U$, U is a leaving group which is eliminable by a base.

4. The reactive yellow dye composition as claimed in claim 3, wherein the base-eliminable U is selected from the group consisting of:

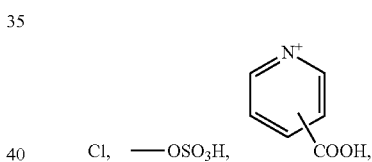
Cl, —$OSO_3H$,       COOH, and quaternary ammonium salt

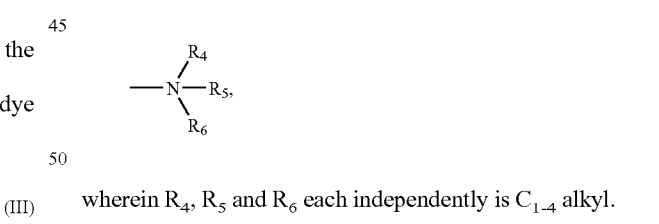

wherein $R_4$, $R_5$ and $R_6$ each independently is $C_{1-4}$ alkyl.

5. The reactive yellow dye composition as claimed in claim 1, wherein the D of formula (II) reactive azo dye is selected from the group comprising the following (D-a) group,

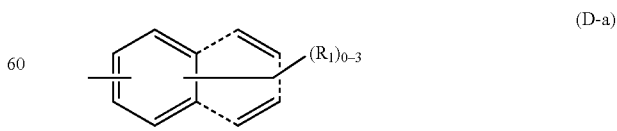
(D-a)

wherein $(R_1)_{0-3}$ represents 0, 1, 2, or 3 $R_1$ substituents, which can be the same or different, selected from the group consisting of: sulfo, methyl and methoxyl.

6. The reactive yellow dye composition as claimed in claim 1, wherein the W of formula (II) reactive azo dye is

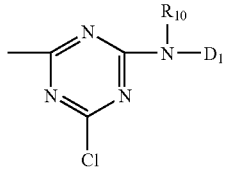

wherein $R_{10}$ is H, methyl or ethyl;

$D_1$ is the following (D-b) group,

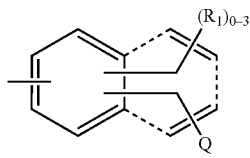

(D-b)

wherein $(R_1)_{0-3}$ represents 0, 1, 2, or 3 $R_1$ substituents, which can be the same or different, selected from the group consisting of: sulfo, methyl and methoxyl;

Q is —NH—CO—CH(Hal)-CH$_2$(Hal), —NH—CO—C(Hal)=CH$_2$ or —SO$_2$—Y, wherein Y is —CH$_2$CH$_2$OSO$_3$H, —CH=CH$_2$ or —CH$_2$CH$_2$U, U is a leaving group which is eliminable by a base; Hal is halogen.

7. The reactive yellow dye composition as claimed in claim 6, wherein the Q of the formula (II) reactive azo dye is —SO$_2$—Y, wherein Y is —CH$_2$CH$_2$OSO$_3$H, —CH=CH$_2$ or —CH$_2$CH$_2$U, U is a leaving group which is eliminable by a base.

8. The reactive yellow dye composition as claimed in claim 7, wherein the base-eliminable U of the formula (II) reactive azo dye is selected from the group consisting of:

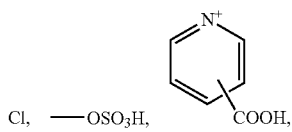

and quaternary ammonium salt

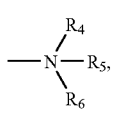

wherein $R_4$, $R_5$ and $R_6$ each independently is $C_{1-4}$ alkyl.

9. The reactive yellow dye composition as claimed in claim 1, wherein the $D_2$ and $D_3$ of formula (III) reactive azo dye each independently is selected from the group consisting of the following (D-a) and (D-b) groups,

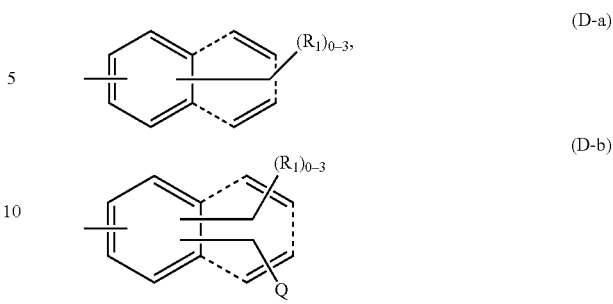

wherein $(R_1)_{0-3}$ represents 0, 1, 2, or 3 $R_1$ substituents, which can be the same or different, selected from the group consisting of: sulfo, methyl and methoxyl;

Q is —NH—CO—CH(Hal)-CH$_2$(Hal), —NH—CO—C(Hal)=CH$_2$ or —SO$_2$—Y, wherein Y is —CH$_2$CH$_2$OSO$_3$H, —CH=CH$_2$ or —CH$_2$CH$_2$U, U is a leaving group which is eliminable by a base; Hal is halogen.

10. The reactive yellow dye composition as claimed in claim 9, wherein the Q of the formula (III) reactive azo dye is —SO$_2$—Y, wherein Y is —CH$_2$CH$_2$OSO$_3$H, —CH=CH$_2$ or —CH$_2$CH$_2$U, U is a leaving group which is eliminable by a base.

11. The reactive yellow dye composition as claimed in claim 10, wherein the base-eliminable U of the formula (III) reactive azo dye is selected from the group consisting of:

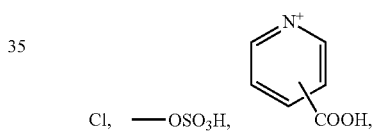

and quaternary ammonium salt

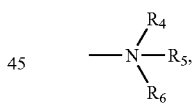

wherein $R_4$, $R_5$ and $R_6$ each independently is $C_{1-4}$ alkyl.

12. The reactive yellow dye composition as claimed in claim 1, wherein the X of the formula (III) reactive azo dye is H.

13. The reactive yellow dye composition as claimed in claim 1, wherein the reactive azo dye of the formula (I) is the following formula (1):

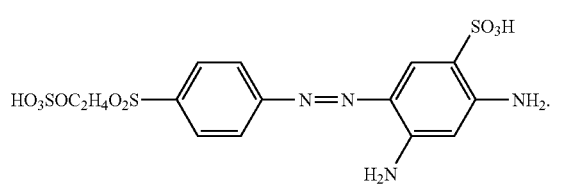

(1)

14. The reactive yellow dye composition as claimed in claim 1, wherein the reactive azo dye of the formula (I) is the following formula (2):

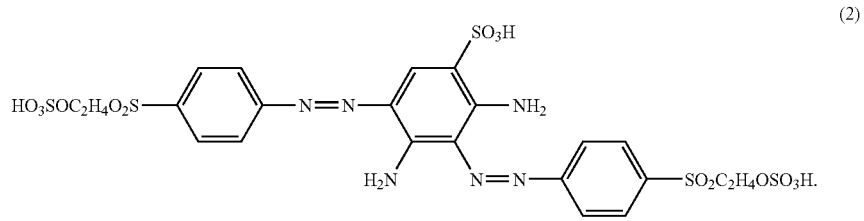
(2)

15. The reactive yellow dye composition as claimed in claim 1, wherein the reactive azo dye of the formula (I) is the following formula (3):

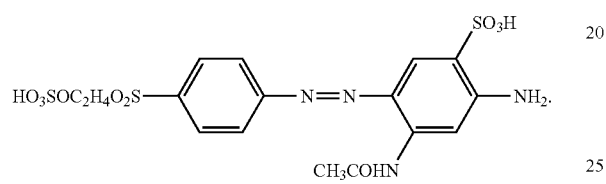
(3)

16. The reactive yellow dye composition as claimed in claim 1, wherein the reactive azo dye of the formula (II) is the following formula (4):

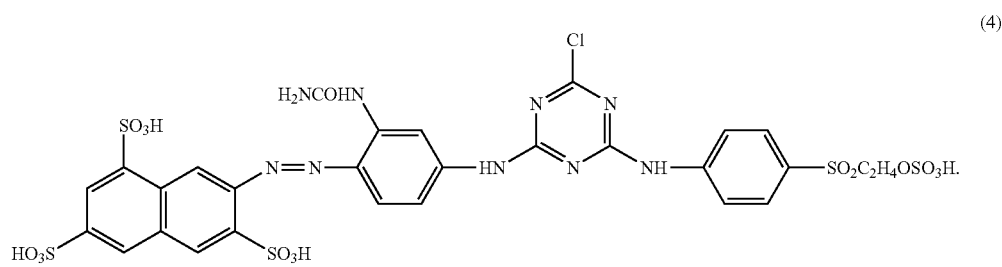
(4)

17. The reactive yellow dye composition as claimed in claim 1, wherein the reactive azo dye of the formula (III) is the following formula (5):

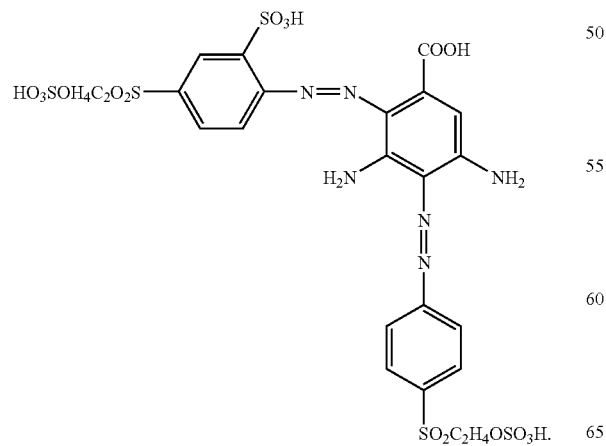
(5)

18. The reactive yellow dye composition as claimed in claim 1, wherein the reactive azo dye of the formula (III) is the following formula (6):

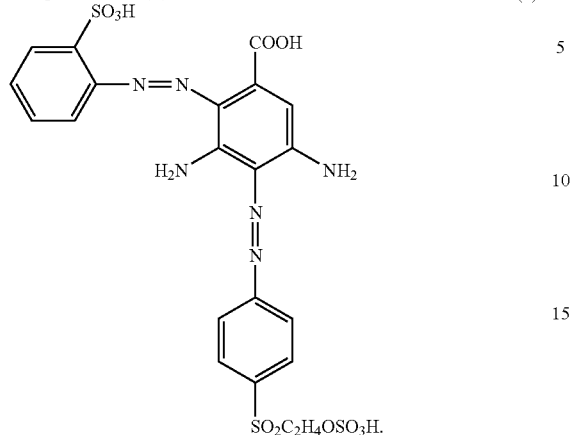

(6)

19. The reactive yellow dye composition as claimed in claim 1, wherein the reactive azo dye of the formula (III) is the following formula (7):

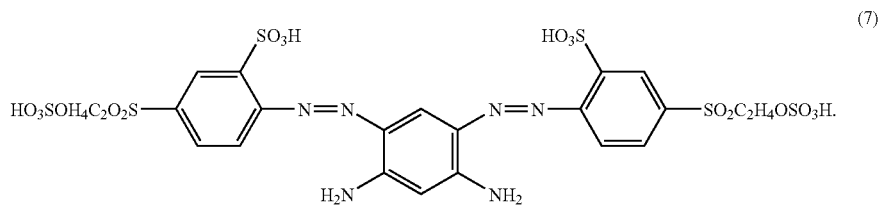

(7)

20. The reactive yellow dye composition as claimed in claim 1, wherein the content of the component (A) is 70% to 98% by weight and the content of the component (B) is 30% to 2% by weight.

21. The reactive yellow dye composition as claimed in claim 1, wherein the content of the component (A) is 80% to 95% by weight and the content of the component (B) is 20% to 5% by weight.

* * * * *